US008862977B2

(12) United States Patent
Suzuki et al.

(10) Patent No.: US 8,862,977 B2
(45) Date of Patent: Oct. 14, 2014

(54) OBJECT DISPLACEMENT METHOD FOR WEB PAGE

(75) Inventors: Hisashi Suzuki, Shinagawa-ku (JP); Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 119 days.

(21) Appl. No.: 13/499,142

(22) PCT Filed: Sep. 27, 2010

(86) PCT No.: PCT/JP2010/066700
§ 371 (c)(1),
(2), (4) Date: Mar. 29, 2012

(87) PCT Pub. No.: WO2011/040371
PCT Pub. Date: Apr. 7, 2011

(65) Prior Publication Data
US 2012/0192048 A1    Jul. 26, 2012

(30) Foreign Application Priority Data

Sep. 30, 2009    (JP) .................................. 2009-228831
Sep. 30, 2009    (JP) .................................. 2009-228832
Oct. 29, 2009    (JP) .................................. 2009-249240
Oct. 29, 2009    (JP) .................................. 2009-249241
Nov. 19, 2009    (JP) .................................. 2009-263529

(51) Int. Cl.
*G06F 17/20*    (2006.01)
*G06Q 30/00*    (2012.01)
*G06F 17/30*    (2006.01)

(52) U.S. Cl.
CPC ............ *G06F 17/3089* (2013.01); *G06Q 30/00* (2013.01)

USPC .......................................................... 715/205

(58) Field of Classification Search
USPC .......................................................... 715/205
See application file for complete search history.

(56) References Cited

U.S. PATENT DOCUMENTS 7,467,349 B1    12/2008    Bryar et al.
7,660,749 B2 *    2/2010    Koski ........................... 705/26.8

(Continued)

FOREIGN PATENT DOCUMENTS

JP    11-185053 A    7/1999
JP    2000-149063 A    5/2000

(Continued)

OTHER PUBLICATIONS

Eick, Visualizing Online Activity, ACM, Communications of the ACM vol. 44 No. 8, Aug. 2001, p. 45-50.*

(Continued)

*Primary Examiner* — Frank D Mills
(74) *Attorney, Agent, or Firm* — Sughrue Mion, PLLC

(57) ABSTRACT

A script (object displacement program) is embedded in a Web page to be transmitted from a Web server 10 and executed by a user terminal 20. The user terminal 20 into which the object displacement program is read displaces a plurality of icons from their initial positions to target positions through a path outside a display area of elements in the Web page, and makes the icons converge on the vicinity of each of the elements in such a way that the icons are distributed to the respective elements in the page in accordance with various access data and statistical data (e.g. the number of page views (PV), click-through rate (CTR), order quantity etc.).

22 Claims, 11 Drawing Sheets

(56) References Cited

U.S. PATENT DOCUMENTS

| | | | |
|---|---|---|---|
| 8,566,180 B2* | 10/2013 | Koski | 705/27.2 |
| 8,572,233 B2* | 10/2013 | Yu et al. | 709/224 |
| 2002/0129363 A1* | 9/2002 | McGuire | 725/37 |
| 2002/0130907 A1* | 9/2002 | Chi et al. | 345/853 |
| 2002/0133417 A1 | 9/2002 | Hanks et al. | |
| 2003/0126613 A1* | 7/2003 | McGuire | 725/109 |
| 2004/0059746 A1* | 3/2004 | Error et al. | 707/102 |
| 2006/0149728 A1* | 7/2006 | Error et al. | 707/5 |
| 2006/0256109 A1* | 11/2006 | Acker et al. | 345/419 |
| 2007/0111789 A1* | 5/2007 | van Deursen et al. | 463/40 |
| 2008/0091553 A1* | 4/2008 | Koski | 705/26 |
| 2008/0140697 A1* | 6/2008 | Papadimitriou et al. | 707/102 |

FOREIGN PATENT DOCUMENTS

| | | | |
|---|---|---|---|
| JP | 2004-518205 A | 6/2004 | |
| JP | 2009-195414 A | 9/2009 | |
| WO | 02/057865 A2 | 7/2002 | |
| WO | 2008/090902 A1 | 7/2008 | |

OTHER PUBLICATIONS

Minar, Nelson, and Judith Donath. "Visualizing the crowds at a web site." in CHI'99 Extended Abstracts on Human Factors in Computing Systems, pp. 186-187. ACM, 1999.*

Chinese Office Action issued in Chinese Patent Application No. 201080043876.4 dated Apr. 3, 2013.

English translation of International Preliminary Report on Patentability dated May 18, 2012 for International Application No. PCT/JP2010/066700.

University of Southern California (USC), "iLab Neuromorphic Vision C++ Toolkit (iNVT)", URL: http://ilab.usc.edu/toolkit/home.shtml, printed Feb. 26, 2012, 5 pages.

University of Southern California (USC), "iLab Neuromorphic Vision C++ Toolkit Screenshots", URL: http://ilab.usc.edu/toolkit/screenshots.shtml, printed Feb. 26, 2012, 7 pages.

European Search Report dated Feb. 6, 2013 issued in European patent application No. 10820496.8.

European Search Report dated Feb. 6, 2013 issued in European patent application No. 10820486.8.

* cited by examiner

*Fig.5*

ICON OBJECT PROPERTY ITEM

| ICON IDENTIFICATION INFORMATION |
|---|
| ICON NUMBER(iconnum) |
| INITIAL POSITION(sx,sy) |
| TARGET POSITION(ex,ey) |
| MOVING DIRECTION(dir) |
| PREVIOUS MOVING DIRECTION(predir) |
| ONE-STEP DISPLACEMENT DISTANCE(step) |
| SKIP THRESHOLD(maxskipcnt) |
| SKIP COUNTER(skipcnt) |
| MOVING DIRECTION INDICATING DATA ARRAY (dirarray) |
| ⋮ |

Fig.11
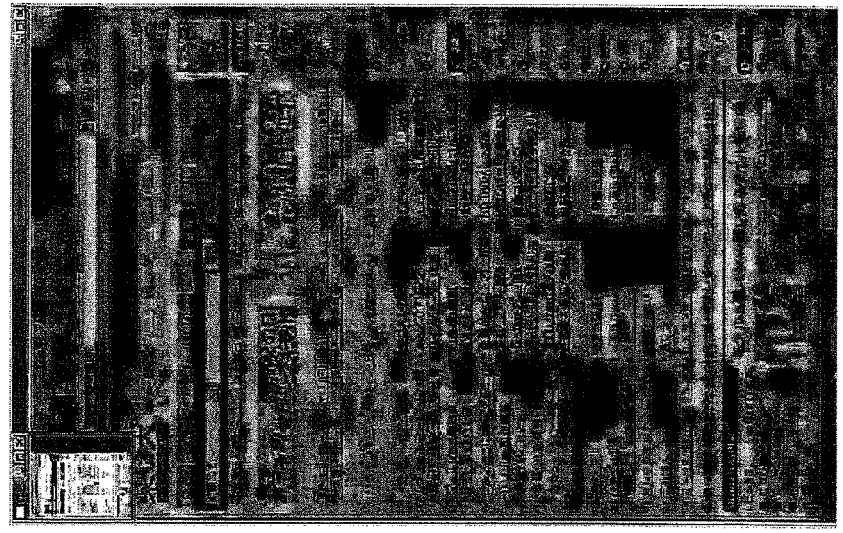
(b)
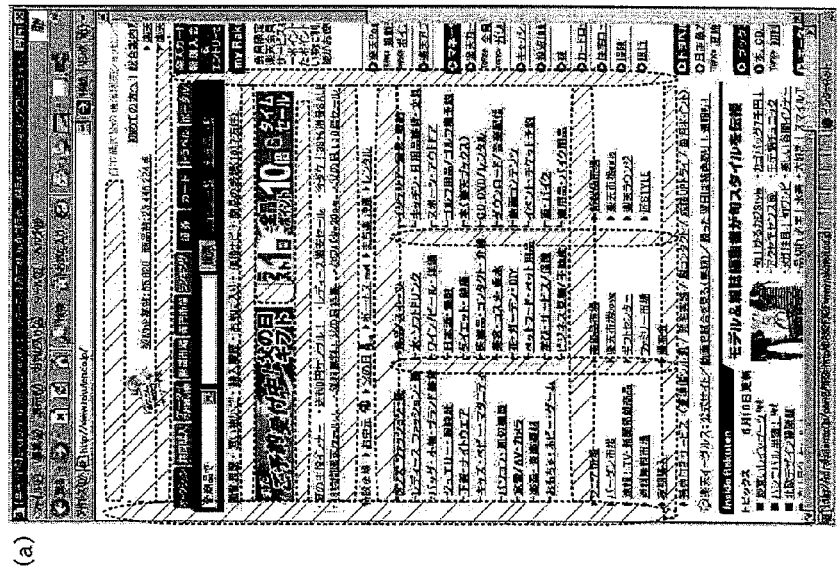
(a)

OBJECT DISPLACEMENT METHOD FOR WEB PAGE

CROSS REFERENCE TO RELATED APPLICATIONS

This application is a National Stage of International Application No. PCT/JP2010/066700, filed on Sep. 27, 2010, which claims priority from Japanese Patent Application Nos. 2009-228831 filed on Sep. 30, 2010; 2009-228832 filed on Sep. 30, 2009; 2009-249240 filed on Oct. 29, 2009; 2009-249241 filed on Oct. 29, 2009; and 2009-263529 filed Nov. 19, 2009, the contents of all of which are incorporated herein by reference in their entirety.

TECHNICAL FIELD

The present invention relates to a framework for displacing an object in a web page and, particularly, to a process of placing the object in a range that does not overlap with elements on the web page and displacing the object through a path that does not overlap with elements on the web page.

BACKGROUND ART

<Related Art 1>

A framework for moving a given image from a specific area to a specific area in a Web page displayed on a screen of a user terminal is known (for example, see Patent Literature 1).

Specifically, an object is displaced on a line segment with a departure area and an arrival area at both ends. This framework is to detect the traffic of the Web page and control the number of objects, the size of objects, and the area to display objects.

<Related Art 2>

A program having the function of generating a saliency map from an input still image and outputting the saliency map in a predetermined file format is disclosed (for example, see Non Patent Literature 1). Further, various application aspects related to the program are specifically described (for example, see Non Patent Literature 2).

Note that, in general, the saliency is the degree of attracting visual attention. Further, the saliency map is visualization of the degree of attracting visual attention calculated using a predetermined algorithm.

<Related Art 3>

There is also a program that interprets data written in a Web page description language and calculates placement of text, images and the like to be actually displayed on a screen, such as HTML rendering engine (for example, see Patent Literature 2), although the technical idea is different from that of Related Art 2. According to this technique, it can be specified in which parts which images and text are displayed by analyzing the HTML source and browser display space.

FIG. 11 illustrates the saliency map cited as Related Art 2.

FIG. 11(a) is a display example of an image captured from a PC screen that is displaying a top page of a Web site administered by the applicant of the present application. On the other hand, FIG. 11(b) is a display example of a saliency map generated from the image of FIG. 11(a).

Note that the still image and the saliency map are both color images.

In the display example of FIG. 11, shaded areas (areas where text, images or the like is not displayed in the Web page) in the still image are determined that saliency is high and are shown by the color corresponding to visible light with a shorter wavelength (generally, purple to green) in the saliency map.

On the other hand, in the same display example, areas outside the shaded areas (areas where text, images or the like is displayed in the Web page) in the still image are determined that saliency is low and are shown by the color corresponding to visible light with a longer wavelength (generally, red to yellow).

CITATION LIST

Patent Literature
Patent Literature 1: U.S. Pat. No. 7,660,749
Patent Literature 2: Japanese Unexamined Patent Application Publication (Translation of PCT Application) No. 2004-518205
Non Patent Literature
Non Patent Literature 1: University of Southern California (USC), "iLab Neuromorphic Vision C++ Toolkit (iNVT)", [online], Internet <URL: http://ilab.usc.edu/toolkit/home-.shtml>
Non Patent Literature 2: University of Southern California (USC), "iLab Neuromorphic Vision C++ Toolkit Screenshots", [online], Internet <URL: http://ilab.use.edu/toolkit/screenshots.shtml>

SUMMARY OF INVENTION

Technical Problem

An object of the present invention is to, in a Web page, analyze the Web page and place a specific object so as not to overlap with elements on the web page.

Another object of the present invention is to, in a Web page, analyze the Web page and displace a specific object so as not to overlap with elements on the web page.

Yet another object of the present invention is to allow a plurality of objects to gradually converge on a specific target in a Web page so as to give a visually crowded impression.

Still another object of the present invention is to allow a plurality of objects to gradually converge on a specific target in a Web page on the basis of the past or current access data such as the number of page views of a Web page, the click-through rate of a Web page, the order quantity of a product sold or a service provided through a Web page (which is referred to hereinafter as "product or the like"), or the traffic of a Web server that provides a Web page.

Solution to Problem

To solve the above problem, the present invention is an object displacement method for a Web page containing a plurality of elements to displace one or a plurality of icons toward each of the elements, including a step of recognizing a display area of the elements in the Web page, a target element setting step of setting any element among the plurality of elements as a target element of the icons, an initial position setting step of setting an initial position of the icons outside the display area of the elements in the Web page by reference to the step of recognizing a display area, a target position setting step of setting a target position within or in a vicinity of a content region of the set target element for each of the icons, and an object displacement step of displacing each of the icons by designating a path starting at the initial position and lying outside the display area of the elements in the Web page and making each of the icons converge on the target position or its vicinity by reference to the step of recognizing a display area.

The object displacement method according to the present invention sets, in a Web page containing a plurality of elements, icons outside a display area of the elements in the Web page, displaces one or a plurality of icons toward each of the elements, and makes the icons converge on each of the elements or its vicinity.

More specifically, the method first sets each of icons at positions that do not interfere with the elements to make sure to display information required by a user.

The method next displaces each of a plurality of icons in a plurality of directions (for example, upward and downward directions, leftward and rightward directions, oblique direction and the like) so as to move around. When displacing the icons, the icons are displaced through paths that do not interfere with the elements.

The method then stops the displacement of each of the icons when the icon enters the peripheral area of the target position set for each icon in the course of the displacement.

According to the present invention, a user and a shop have a one to one relationship as a general rule in online shopping. In the present invention, the plurality of elements are tangible representations of a shopping street or shopping mall, and the plurality of icons are tangible representations of users coming to the shopping street or shopping mall.

The plurality of icons are displaced in a plurality of directions (for example, upward, downward, leftward and rightward directions, oblique direction and the like) to move around and then converge on the vicinity of a specific element in the page, thereby visually representing the way shoppers gather at a specific product or a specific shop to form "crowded gathering".

As a result, users who visit the Web page can intuitively and visually recognize the degree of popularity of each content. Further, because users keep their eyes on the Web page until the icons converge, duration of visit for the Web page increases.

Further, it is preferred in the present invention that the method includes an access data extraction step of extracting one data from access data including at least one of the number of page views of a Web page linked from each of the elements during a past certain time period, a click-through rate of a link corresponding to each of the elements during a past certain time period, and an order quantity of a product sold or a service provided through a Web page linked from each of the elements during a past certain time period, and the target element setting step sets the target element among the plurality of elements based on the extracted access data.

In the invention described above, a popular page is selected as the target element based on the access data of one day ago, one week ago, one month ago or one year ago, for example. This allows visual recognition of a good product or the like in the past using the use histories of users not by text information or numerical information but by the movement of the icons.

Further, in the invention described above, a popular page is selected as the target element based on the current access data. This allows visual recognition of a good product or the like only at the current time.

Further, it is preferred in the invention described above that the method includes an access load detection step of detecting a current server load of a Web server that provides a Web page linked from each of the elements, and the target element setting step sets the target element among elements for which the server load is less than a certain threshold.

In the invention described above, by detecting the current server load, it is possible to inhibit the transition to a page in which congestion is likely to occur and thereby guide a user to a page that causes no stress and equalize the server load.

Further, in the invention described above, it is preferred that the method includes an access data extraction step of extracting one data during a certain time period being a certain period ago among access data including at least one of the number of page views of a Web page linked from each of the elements during a past certain time period, a click-through rate of a link corresponding to each of the elements during a past certain time period, and an order quantity of a product sold or a service provided through a Web page linked from each of the elements during a past certain time period, and the initial position setting step includes a step of deciding the number of initial positions based on the extracted data by reference to the access data extraction step, and sets the plurality of initial positions at positions outside the display area of the elements in the Web browser.

By setting the number of initial positions by reference to the user histories of the same time back from the present, a relatively large number of icons are displayed at a date and time when the number of accesses is likely to be large and a relatively small number of icons are displayed at a date and time when the number of accesses is likely to be small. The current "crowded gathering" is statistically estimated from the past histories of users' operations on a terminal. This allows visual representation of "crowded gathering" arising from the calendar factor.

It is preferred that the period is a period of any one of one day, one week, one month and one year, the certain time period is a certain length of time, and the initial position setting step decides the number of initial positions based on any data of the number of page views, a click-through rate and an order quantity during the length of time.

In the invention described above, it is possible to visually represent "crowded gathering" arising from the calendar factor.

It is preferred that the method includes an access data extraction step of extracting one data from access data including at least one of the number of page views of a Web page linked from each of the elements during a past certain time period, a click-through rate of a link corresponding to each of the elements during a past certain time period, and an order quantity of a product sold or a service provided through a Web page linked from each of the elements during a past certain time period, and the target position setting step sets the target element for each of the plurality of icons based on the extracted access data.

In the invention described above, only the popular page is set as the target element by reference to the user history. It is thereby possible to allow visual recognition of convergence of users on a good product or the like at the current time.

By setting the target element of each of the icons based on the past access data and making the icons converge on the element, it is possible to allow a user to visually recognize a popular product or the like.

Further, in the invention described above, it is preferred that the method includes an access load detection step of detecting a current server load of a Web server that provides a Web page linked from each of the target element, and the target position setting step sets an element including the target position from each of the target element based on the server load.

By detecting the current server load and setting the target element based on the server load, it is possible to guide a user to a page that causes no stress and equalize the server load.

It is preferred that the object displacement step includes a next position candidate setting step of setting a plurality of next position candidates being candidates for a position at which the object is to be displayed next, a next position setting step of selecting any one position from the set next position candidates and setting the selected position as a next display position, and an object next position displacement step of displacing the object from a current display position to the set next display position.

In this invention, the next position candidates of each of the icons are set, and the next display position is set among the candidate positions, so that the icons move or wander around the page. Finally, the icons converge on their target positions. However, because the icons are not displaced in a linear fashion but are displaced in close proximity to a plurality of elements until the convergence is reached, it is possible to avoid excessive transition to a specific element.

Further, because users keep their eyes on the Web page until the icons converge, duration of visit for the Web page increases.

It is preferred that the next position candidate setting step sets a plurality of next direction candidates being candidates for a direction in which the object is to be displaced next, unevenly distributed toward the target position, in accordance with a positional relationship between a current display position of the object and the set target position, and the next position setting step sets the next position in each of directions of the set next direction candidates.

In this invention, because a plurality of next direction candidates are set to be unevenly distributed toward the target position in accordance with a positional relationship between the display position and the target position, it is possible to speed up the convergence of the icons on the target positions.

It is preferred that execution of the object next position displacement step is performed when the next position set in the next position setting step is outside the display area of the elements, and execution of the object next position displacement step is inhibited when the next position set in the next position setting step is not outside the display area of the elements.

This not only prevents the icons from being displaced into the elements but also lets the icons stop during the step of inhibiting the execution, thereby increasing variety of motion of the icons by a simple process.

Further, it is preferred that the object displacement step includes processing of temporarily stopping each of the icons at a certain probability or at random during displacement of the icon for each of the icons.

This allows representation of the stopping motion of the icon to indicate that interest is attracted by the element near the stopping point.

It is preferred that the method includes an access data extraction step of extracting one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period, and the object displacement step includes processing of temporarily stopping each of the icons during displacement of the icon for each of the icons when the extracted access data is more than a certain threshold.

In this invention, because an increase in access to a specific Web page is detected in real time and convergence of the icons on the Web page is temporarily stopped, it is possible to temporarily lessen the attention attracting to the page in which the access increases easily such as a time sale of an EC site, so that the Web page can be displayed without causing stress to users who actually access the page.

Further, because users keep their eyes on the Web page until the icons converge, duration of visit for the Web page increases.

It is preferred that the method includes an access data extraction step of extracting one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period, and the object displacement step delays convergence of each of the icons on the target position or its vicinity for each of the icons when the extracted access data is more than a certain threshold.

In this invention, because an increase in access to a specific Web page is detected in real time and the convergence of the icons on the Web page is delayed, it is possible to temporarily lessen the attention attracting to the page in which the access increases easily such as a time sale of an EC site, so that the Web page can be displayed without causing stress to users who actually access the page.

It is preferred that the method includes an access data extraction step of extracting one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period, and the object displacement step promotes convergence of each of the icons on the target position or its vicinity for each of the icons when a differentiated value of the extracted access data is less than a certain threshold.

In this invention, the differentiated value of the current access data is extracted to thereby detect that sudden access concentration does not occur, that is, access to a specific Web page indicates stationary behavior, or detect that it is getting less crowded, thereby guiding the behavior of users to a specific page.

It is preferred that the method includes an access data extraction step of extracting one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period, and the object displacement step delays convergence of each of the icons on the target position or its vicinity for each of the icons when a differentiated value of the extracted access data is more than a certain threshold.

In this invention, the differentiated value of the current access data is extracted to thereby predict that sudden access concentration is likely to occur, that is, detect in real time that access to a specific Web page is suddenly increasing, thereby delaying the convergence of the icons on the Web page. It is thereby possible to guide a user to a page that causes no stress and thereby avoid excessive access concentration to the specific page.

It is preferred that the method includes an access load detection step of detecting a server load of a Web server that provides a Web page linked from each of the target element during a current certain time period, and the object displacement step promotes convergence of each of the icons on the target position or its vicinity for each of the icons when a differentiated value of the server load is less than a certain threshold.

In this invention, because the server load of a Web server that provides a specific Web page is detected, and the convergence of the icons on the Web page with small load is promoted, it is possible to appeal users for the Web page that causes no stress in real time and thereby avoid excessive access concentration to the specific page.

It is preferred that the method includes an access load detection step of detecting a server load of a Web server that provides a Web page linked from each of the target element during a current certain time period, and the object displacement step delays convergence of each of the icons on the target position or its vicinity for each of the icons when a differentiated value of the server load is more than a certain threshold.

In this invention, because the server load of a Web server that provides a specific Web page is detected, and the convergence of the icons on the Web page with heavy load is delayed, it is possible to raise the opportunity to transition to another page and thereby avoid excessive access concentration to the specific page.

Further, by detecting the access data or the server load and promoting the convergence of the icons for each of the elements or delaying the convergence of the icons for each of the elements, it is possible to guide a user to a page that allows no stress operation in the Web page containing a plurality of elements.

BRIEF DESCRIPTION OF DRAWINGS

FIG. 5 is an explanation diagram of icon object property items (embodiment).

FIG. 11 is a display example of (a) still image and (b) saliency map.

DESCRIPTION OF EMBODIMENTS

Definition

Element . . . Generic term for text, image, figure, button and the like that are displayed in a Web page.
Link element . . . Element for which a link to another Web page is set up
Icon . . . Display of various data or processing function as picture or pictograph on a display screen. In the following description, image for which a link to another Web page is not set up Content Region of Element . . . Area where an element is displayed in a Web page. In the case of text for which a link is set up, range surrounded by a dotted line or the like when selected. In the case of image, figure, button or the like, inside the frame of the image, figure, button or the like.
Display Space of Browser . . . Area displayed by a browser in a Web page
Displacement . . . To move a specific icon from a first point to a second point. For example, the following aspects are included.

(a) Assume a plurality of points on a line (line segment, curved line, polygonal line) connecting the first point and the second point and repeat display and removal of the icon at each point sequentially at high speed.

(b) Slide the icon currently displayed at the first point to the second point.

(c) When the first point and the second point are in close proximity, remove the icon currently displayed at the first point and display the icon at the second point (d) Repeat at least any of the above (a) to (c) several times starting from the first point and finally place the icon at the second point Embodiment 1. System Configuration FIG. 1 shows a configuration of a system according to this embodiment.

Figure 1:
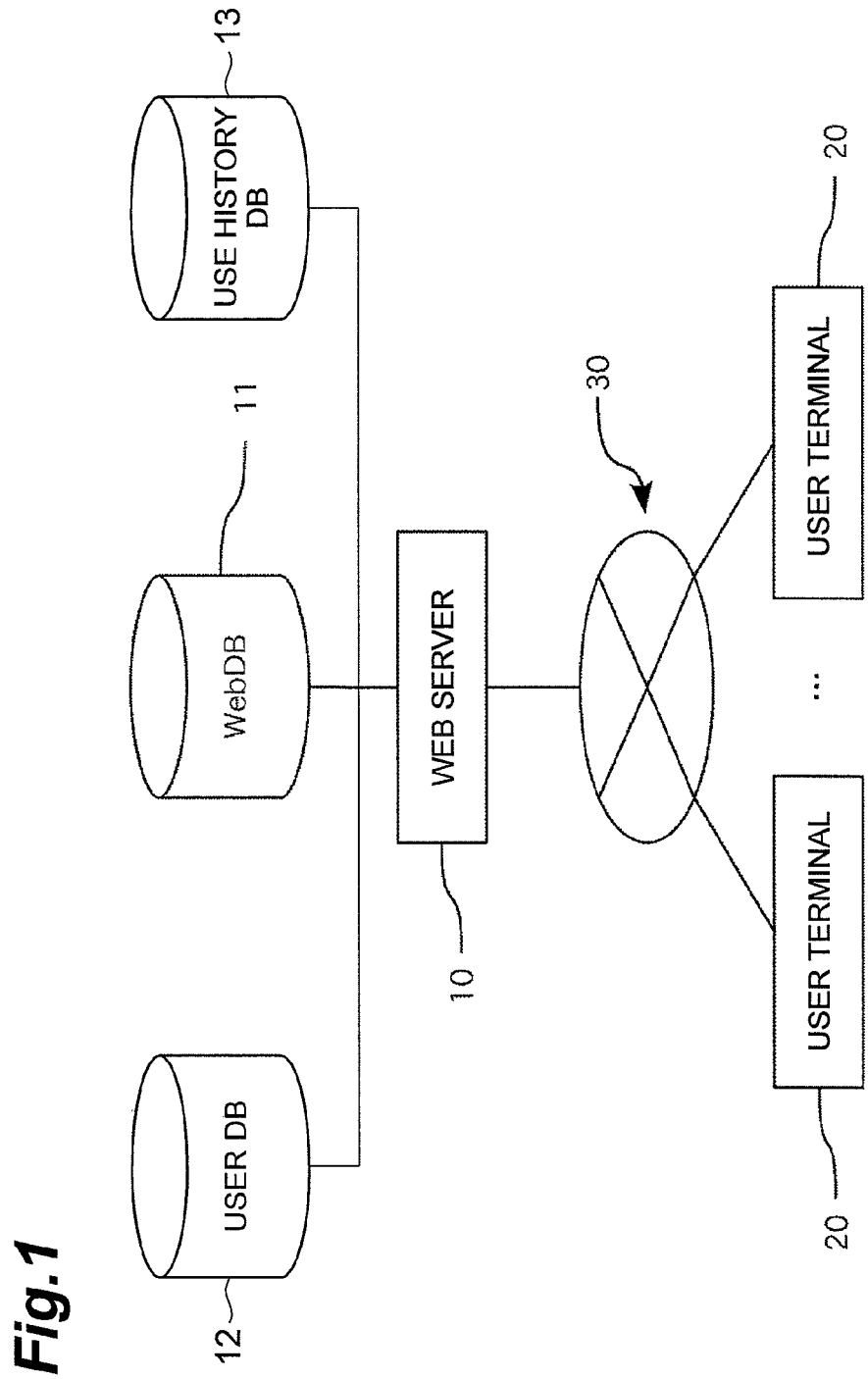
FIG. 1 is a block diagram showing a system configuration (embodiment).

As shown in FIG. 1, the system according to the embodiment is a client-server system in which a Web server 10 and a user terminal 20 are connected through a communication network (which is Internet 30 in this embodiment).

The Web server 10 includes a Web DB 11 that stores various data (HTML and image referred to by the HTML, style sheet, script and the like, which are hereinafter referred to collectively as "Web data") which constitute a Web page, and transmits designated Web data to the user terminal 20 in response to a request from the user terminal 20.

Further, the Web server 10 includes a user DB 12 that stores user registration information (address, name, age, gender and email address, which are hereinafter referred to collectively as "user attribute"). The user DB 12 provides attribute information for creating a Web page to the Web server 10.

Further, the Web server 10 includes a use history DB 13 that stores the past use history (the number of page views, the click-through rate, the order quantity for each date, day of week or time) of each Web page. The use history DB 13 provides history information for creating a Web page to the Web server 10.

The user terminal 20 has a Web browser, reads the Web data received from the Web server 10 and displays the data on a display. It is assumed that the Web browser is capable of interpretation and execution of a script (for example, a program written in JavaScript), and settings for interpretation and execution are ON.

The user terminal 20 may be an existing information processing terminal having communication functions (for example, an electronic computer such as a personal computer).

2. Object Displacement Program

[(a) Feature]

In the system according to the embodiment, a script (object displacement program) is embedded in a Web page to be transmitted from the Web server 10, and executed by the user terminal 20. It is assumed that a plurality of link elements (such as link elements for which a link to another Web page is set up) are placed in the Web page.

The user terminal 20 into which the object displacement program is read displaces a plurality of icons (images for which a link to another Web page is not set up) from their initial positions to target positions in the Web page and makes the icons converge on the vicinity of each element in such a way that the icons are proportionally distributed to the respective elements in the page in accordance with various access data and statistical data (for example, the number of page views (PV), the click-through rate (CTR), the order quantity and the like). At this time, the icons may be displayed superimposed on the front of a link element to intentionally interfere with clicking on the link element by a user.

In the system according to the embodiment, the plurality of link elements are tangible representations of a shopping street or shopping mall in a Web page. On the other hand, the plurality of icons are tangible representations of users coming to the shopping street or shopping mall.

By displacing the plurality of icons from predetermined starting points to the plurality of link elements serving as predetermined end points, the stream of people heading to shops or products is represented on the Web page. As a result, it is possible to create a populated atmosphere within the Web page and thereby allows users to intuitively and visually recognize the degree of popularity of each content.

To be more precise, in the present invention, a display area of elements in a Web page is recognized first.

An example of this embodiment is to generate a capture image of a Web page, generate a saliency map from the generated image, calculate priorities according to the saliency for each of pixels of the generated saliency map, and thereby recognize the pixel region with a high priority as the display area of elements.

Another example of this embodiment is to interpret data written in a Web page description language and calculate placement of text, images and the like to be actually displayed on a screen, such as HTML rendering engine, in HTML data or XML data to be transmitted to the user terminal 20 and thereby recognize the display area of elements within the Web page.

Next, at least one element is set among the plurality of elements in the Web page. At least one element may be set among the plurality of elements on the basis of the current or past various access data and statistical data (for example, the number of page views (PV), the click-through rate (CTR), the order quantity and the like). Further, at least one element may be set among the plurality of elements by recognizing elements desired to be accessed and elements not desired to be accessed according to the current server load.

For the setting of elements, the current access data, the past data during a certain time period which was a certain period ago, or the current server load may be used. In any case, a threshold may be set, and the element may be set on the basis of the threshold.

Then, the initial position of an icon is set outside the display area of elements in the Web page. The number of icons may be one or two or more. In the case of setting a plurality of icons, the number of icons may be decided according to the current or past access data or the current server load. In the case of using the access data, the shape of the icon may be varied depending on user attributes (attributes such as gender, age and district) by referring to the use history.

Then, a target position is set within or in the vicinity of the content region of the set target element for each of the icons. The target position is set from the target elements. When all elements are the target elements, those elements serve as candidates for the target position. However, not all candidates are set as the target position in some cases.

By setting the target position within the content region, setting the icons on the element, and displaying the icons that have converged superimposed on the element, it is possible to represent the degree of attracting attention of a product or the like related to the element. Further, by setting the target position of the icons outside the display area in the vicinity of the element, it is possible to display the content of the element for a user and further represent the degree of attracting attention of the product or the like.

Then, in the object displacement step, the icons are made to converge on their target positions by designating a path lying outside the display area from the initial position in the state where the display area is recognized. The icons thereby do not enter the display area and are displaced in the state where the element is displayed, so that information of the product or the like that is receiving attention is not hidden, and an operation to transition to a specific page can be performed even when a user gets interested in the product or the like in the course of displacement of the icon.

[(b) Execution Procedure]

Figure 2:
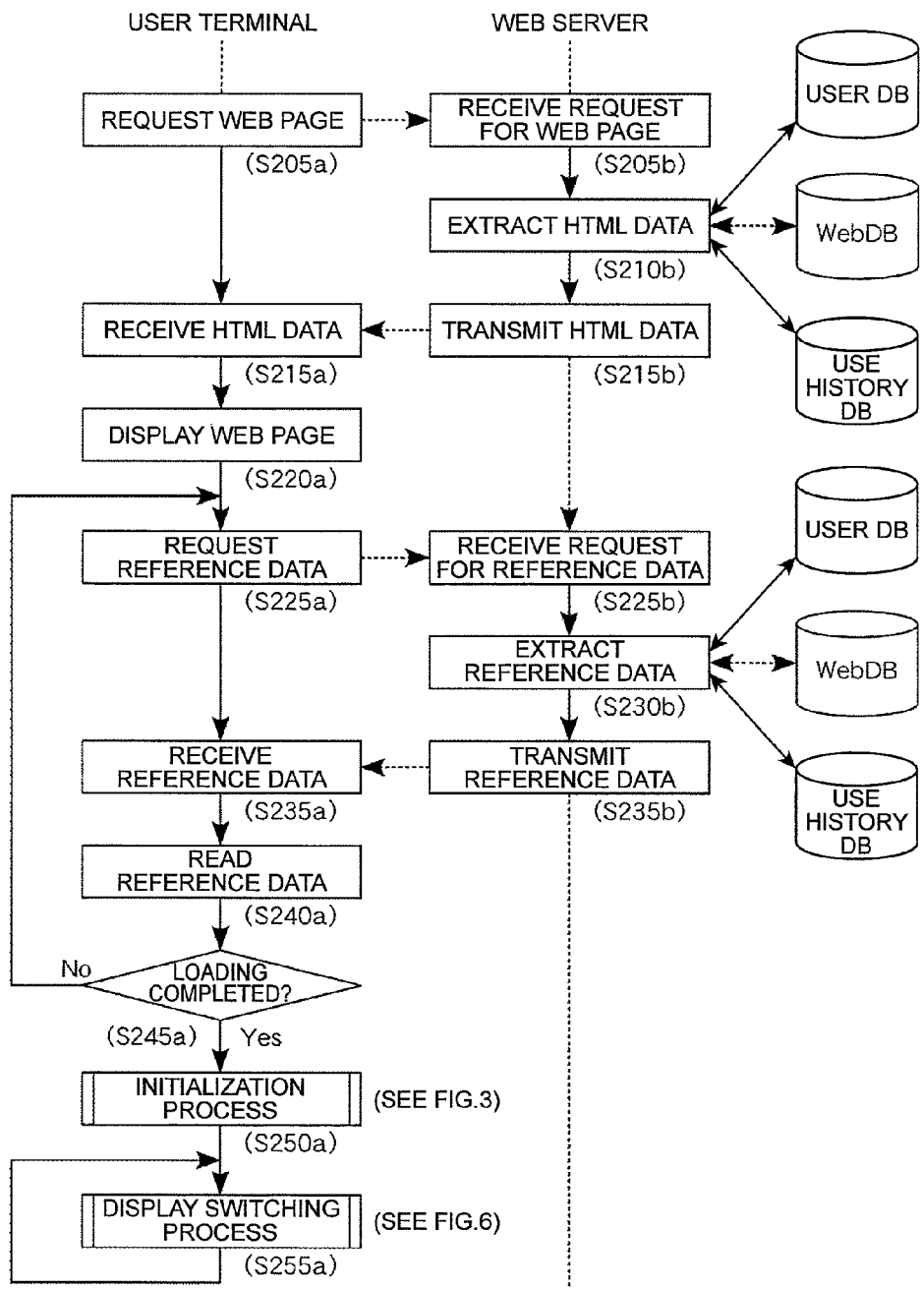
FIG. 2 is a flowchart showing an execution procedure of an object displacement program (embodiment).

FIG. 2 shows the execution procedure of the object displacement program in the system according to the embodiment.

<11> The user terminal 20 makes a request for a Web page by designating a URL to the Web server 10 (S205$a$). The Web server 10 receives the request for the Web page from the user terminal 20 (S205$b$), extracts HTML data corresponding to the designated URL from the Web DB 11 and refers to the user DB 12 and the use history DB 13 according to need (S210$b$), and then transmits the data to the user terminal 20 (S215$b$). The user terminal 20 receives the HTML data from the Web server 10 (S215$a$) and displays the Web page on the display (S220$a$).

<12> The user terminal 20 makes a request for reference data in the HTML data by designating a URL to the Web server 10 (S225$a$). The Web server 10 receives the request for the reference data from the user terminal 20 (S225$b$), extracts reference data corresponding to the designated URL from the Web DB 11 and refers to the user DB 12 and the use history DB 13 according to need (S230$b$) and then transmits the data to the user terminal 20 (S235$b$). The user terminal 20 receives the reference data from the Web server 10 (S235$a$), reads the reference data (S240$a$), and reflects the data on the currently displayed Web page according to need.

<13> The user terminal 20 determines whether loading of the Web page (including the reference data) has completed or not (S245$a$). When the loading has not completed (No in S245$a$), the process returns to the above <12> and the user terminal 20 further acquires other reference data. On the other hand, when the loading has completed (Yes in S245$a$), the process proceeds to the following <14> and starts execution of the script (object displacement program).

<14> An initialization process (S250$a$, FIG. 3) and a display switching process (S255$a$, FIG. 6) are executed. Note that the display switching process (S255$a$) is configured to be executed repeatedly every given time period (for example, 100 milliseconds).

3. Initialization Process

[(a) Procedure of Initialization Process]

Figure 3:
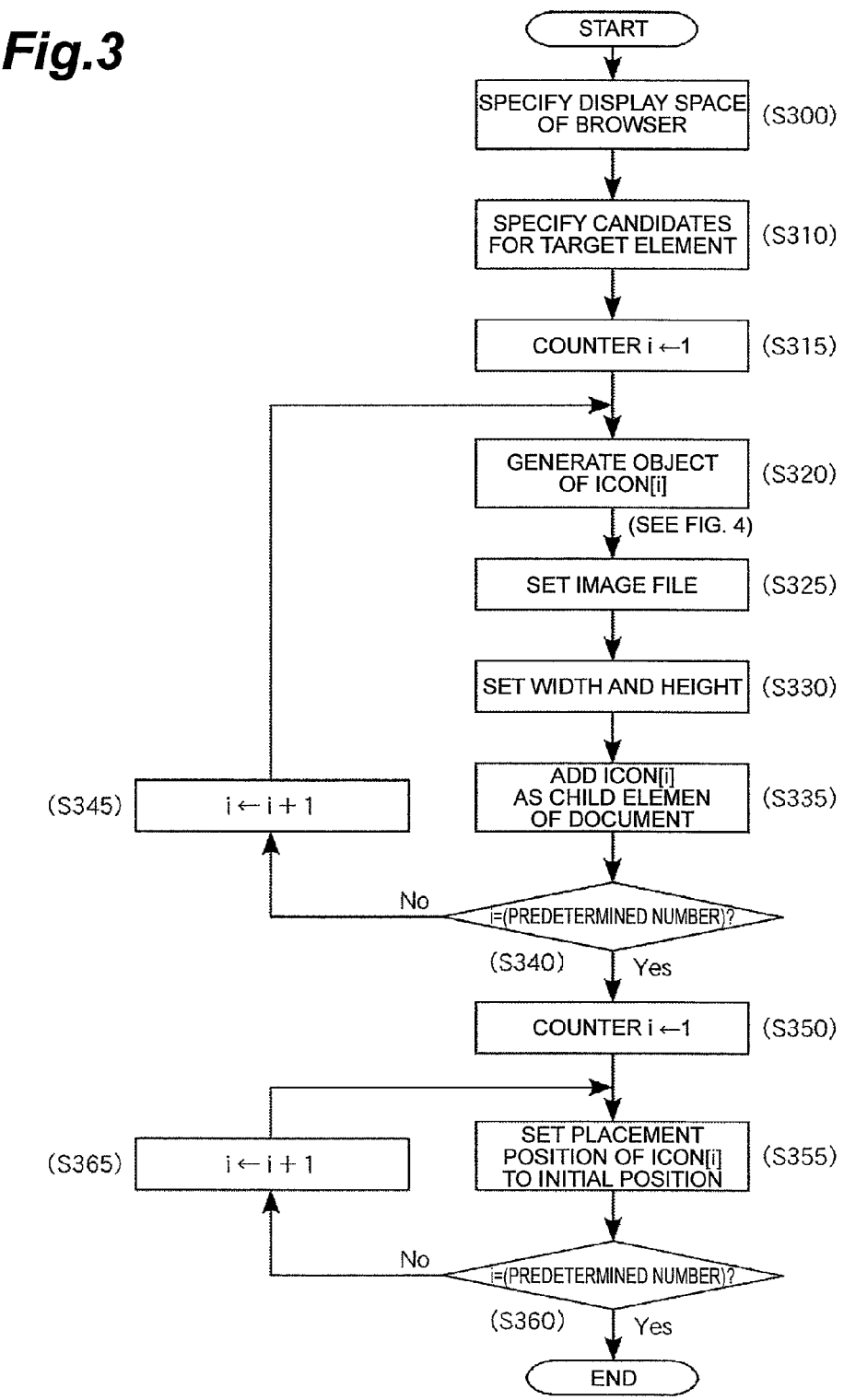
FIG. 3 is a flowchart showing a procedure of an initialization process (embodiment).

FIG. 3 shows a procedure of an initialization process.

Hereinafter, a procedure to generate a predetermined number (100 in this embodiment) of icons (objects) and place those icons in different positions in a Web page is described by way of illustration. Note that the case where some icons are placed in overlapping positions is also included.

As shown in FIG. 3, the user terminal 20 executes the initialization process by the following steps <21> to <27>. Note that the icon [i] indicates the i-th icon (icon to which identification information containing i is attached).

<21> Specify the display space of the browser (S300).

Figure 4:
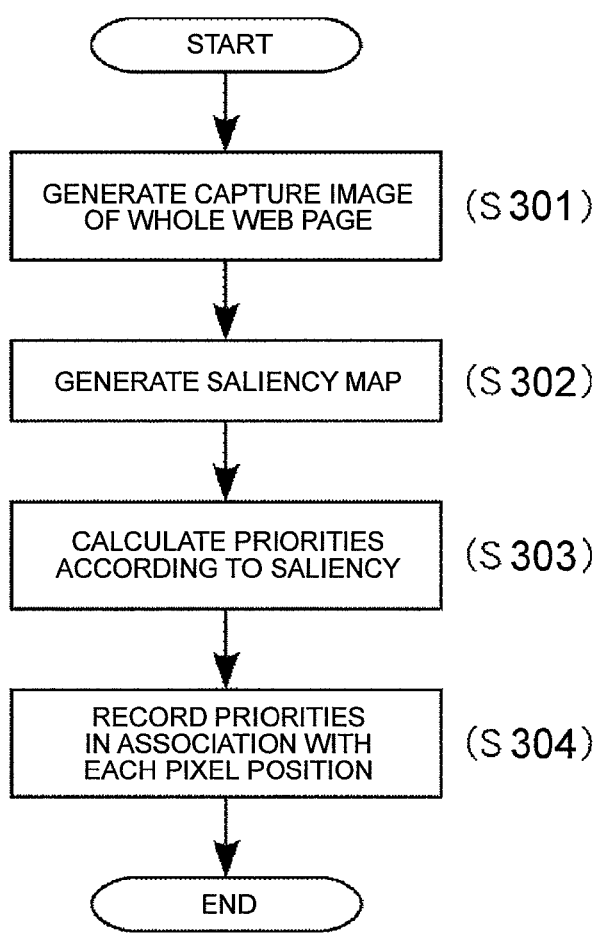
FIG. 4 is a flowchart showing an icon path data generation procedure (embodiment).

As shown in FIG. 4, generate a capture image of a Web page (S301). Next, generate a saliency map from the generated image (S302). Note that a saliency map generation program is preferably used for the generation of the saliency map. Calculate priorities according to the saliency for each of pixels of the generated saliency map (S303), and record the priorities in association with each of the pixels (S304). The priority data are preferably stored in the Web DB 11 in a given file format (for example, JSON).

The pixel region with a high priority is thereby recognized as the display area of elements. In FIG. 11, the shaded areas in the still image are determined that saliency is high and are shown by the color corresponding to visible light with a shorter wavelength in the saliency map. In the same display example, areas outside the shaded areas in the still image are determined that saliency is low and are shown by the color corresponding to visible light with a longer wavelength (generally, red to yellow).

Then, specify candidates for the target element among the elements placed in the Web page (S310). To specify candidates for the target element, at least one element is set among a plurality of elements by the current or past various access data and statistical data (for example, the number of page views (PV), the click-through rate (CTR), the order quantity and the like) by reference to the use history DB 13. Further, at least one element may be set among a plurality of elements by recognizing elements desired to be accessed and elements not desired to be accessed according to the current server load by reference to the Web server 10. For the setting of elements, the current access data, the past data during a certain time period which was a certain period ago, or the current server load may be used. In any case, a threshold may be set, and the element may be set on the basis of the threshold.

Further, it is preferred to specify candidates for the target element by obtaining the differentiated value of the current access data, the past data during a certain time period which was a certain period ago, or the current server load by time, determining a Web page in which access concentration is likely to occur or a Web page for which the server load is on the increase, and then performing processing to include it into candidates for the target element or exclude it from candidates for the target element.

<22> Substitute an initial value 1 into a counter i indicating the icon number (S315).

<23> Generate an object of an icon (image element) (icon [i]) (S320). Then, set an image file to the icon[i] (S325), set the size (width and height) of the icon[i] in the Web page (S330), and add the icon[i] as a child element of a document element (S335).

<24> Determine whether the counter i is equal to a predetermined number (100 in this embodiment) (S340). When the counter i is not equal to the predetermined number (No in S340), add 1 to the counter i (S345) and return to the above <23>. On the other hand, when the counter i is equal to the predetermined number (Yes in S340), proceed to the following <25>.

Although the case where the counter i is 100 is described by way of illustration, the value of the counter is preferably set as follows. The value of the counter is the number of icons. When all icons are placed in different initial positions, the value of the counter equals the number of initial positions.

Note that, as an alternative example, the initial position may be set at the same position 100 times with the number of icons remaining at 100. In this case, 100 icons are apparently displaced from the same initial position to their target positions.

The value of the counter is preferably set from at least one of the number of page views of the Web page of each element during the past certain period, the click-through rate of each element during the past certain period, and the order quantity of a product sold or a service provided through the Web page of each element during the past certain period by reference to the use history DB 13. By extracting one data during a certain time period which was a certain period ago from those access data and setting the value of the counter, the Web page can be displayed in the condition similar to the condition where a user is making access.

Further, the value of the counter may be set by obtaining the differentiated value of the current access data or the current server load by time and determining a Web page in which access concentration is likely to occur or a Web page for which the server load is on the increase.

<25> Substitute 1 into the counter i indicating the icon number (S350).

<26> Set the placement position of the icon[i] to the initial position (S355). At this point, the icon[i] is displayed outside the display area in the Web page.

<27> Determine whether the counter i is equal to a predetermined number (100 in this embodiment) (S360). When the counter i is not equal to the predetermined number (No in S360), add 1 to the counter i (S365) and return to the above <26>. On the other hand, when the counter i is equal to the predetermined number (Yes in S360), the initialization process ends.

[(b) Display Space of Browser]

In the above step <21>, the user terminal 20 specifies the display space of the browser (S305).

In the state just after reading the Web page, the display space of the browser is a rectangular defined by the following range in the pixel coordinates with the origin (0,0) located at the top left corner of the Web page and with the positive direction of the x-axis and the y-axis along the rightward direction and the downward direction.

Top left corner (0, 0)

Bottom right corner (value of width of browser display space, value of height of browser display space)

The values of the width and height of the browser display space can be acquired as the values of the following properties, for example, in the object displacement program. The browser display space is preferably specified using appropriate values of the properties according to the type of the browser and the display mode (Standards mode, Quirks mode).

Width of browser display space: document.body.clientWidth, document.documentElement.clientWidth Height of browser display space: document.body.clientHeight, document.documentElement.clientHeight

[(c) Candidates for Target Element]

In the above step <21>, the user terminal 20 specifies candidates for the target element among the elements placed in the Web page (S310).

For example, it is preferred to specify candidates for the target element as follows.

Given identifiers (id) are added to specific elements (for example, specific link images, specific link text or other specific link elements) in the Web page, and the elements to which the identifiers are added are selected as candidates for the target element.

[(d) Icon Object Property Item]

In the above step <23>, the user terminal 20 generates the object of the icon (icon[i]) (S320).

In this step, for example, a plurality of properties (attributes) to be used for control of the icon[i] and a plurality of methods (procedures) to control the icon[i] are defined by reference to the user DB 12.

FIG. 5 shows major property items of icon objects.

As shown in FIG. 5, each icon object contains "icon identification information", "icon number", "initial position", "target position", "moving direction", "previous moving direction", "one-step displacement distance", "skip threshold", "skip counter", and "moving direction indicating data array".

The "skip threshold" is a fixed or random numerical value.

[(d-1) Icon Number]

In FIG. 5, the "icon number" is a numerical value corresponding to the type of the icon set to the icon[i].

The icon number is appropriately set according to attributes (for example, gender, age group and the like) of users who constitute a population of statistical data used for proportional distribution of icons and the ratio of users having each of the attributes. For example, when the gender ratio of users who constitute a population of statistical data is 40:60, the icon number is preferably set so that the icon number corresponding to male:the icon number corresponding to female=40:60.

[(d-2) Initial Position]

In FIG. 5, the "initial position" is a position at which the icon[i] is displayed first in the Web page. In this embodiment, the initial position is set at a random position outside the display area within the browser display space specified in the above step <21>.

Alternatively, the initial position may be set at a specific position in the Web page.

[(d-3) Target Position]

In FIG. 5, the "target position" is a position indicating a position on which the icon[i] finally converges in the Web page. In this embodiment, any of the candidates for the target element specified in the above step <21> is selected by the probability proportional to the size of the statistical data corresponding to each of the elements (candidates), for example, and the top left corner position of the selected target element or a random position outside the display area within the content region of the element is set as the target position. Further, the target position may be set by selecting a target element for each icon number (user attribute).

Note that, as the statistical data, the number of page views of a Web page linked from each target element (candidate), the click-through rate (CTR) of the link, the order quantity of a product sold or a service provided through the Web page or the like is preferable. Further, it is feasible to calculate the differentiated value of them by time, determine the element in which access stays steady or the element in which access is on the increase, and maintain the element as the target position or exclude it from the target position. This enables reduction of access concentration to a specific element. This process may be performed by setting a certain threshold for the differentiated value and maintaining the element as the target position or excluding it from the target position by reference to the threshold.

[(d-4) Moving Direction, Previous Moving Direction]

In FIG. 5, the "moving direction" is a numerical value indicating the direction of movement of the icon[i]. Further, the "previous moving direction" is a numerical value indicating the previous direction of movement of the icon[i]. For example, the value may be set as 0(stop), 1(up), 2(right), 3(down) and 4(left).

Figure 6:
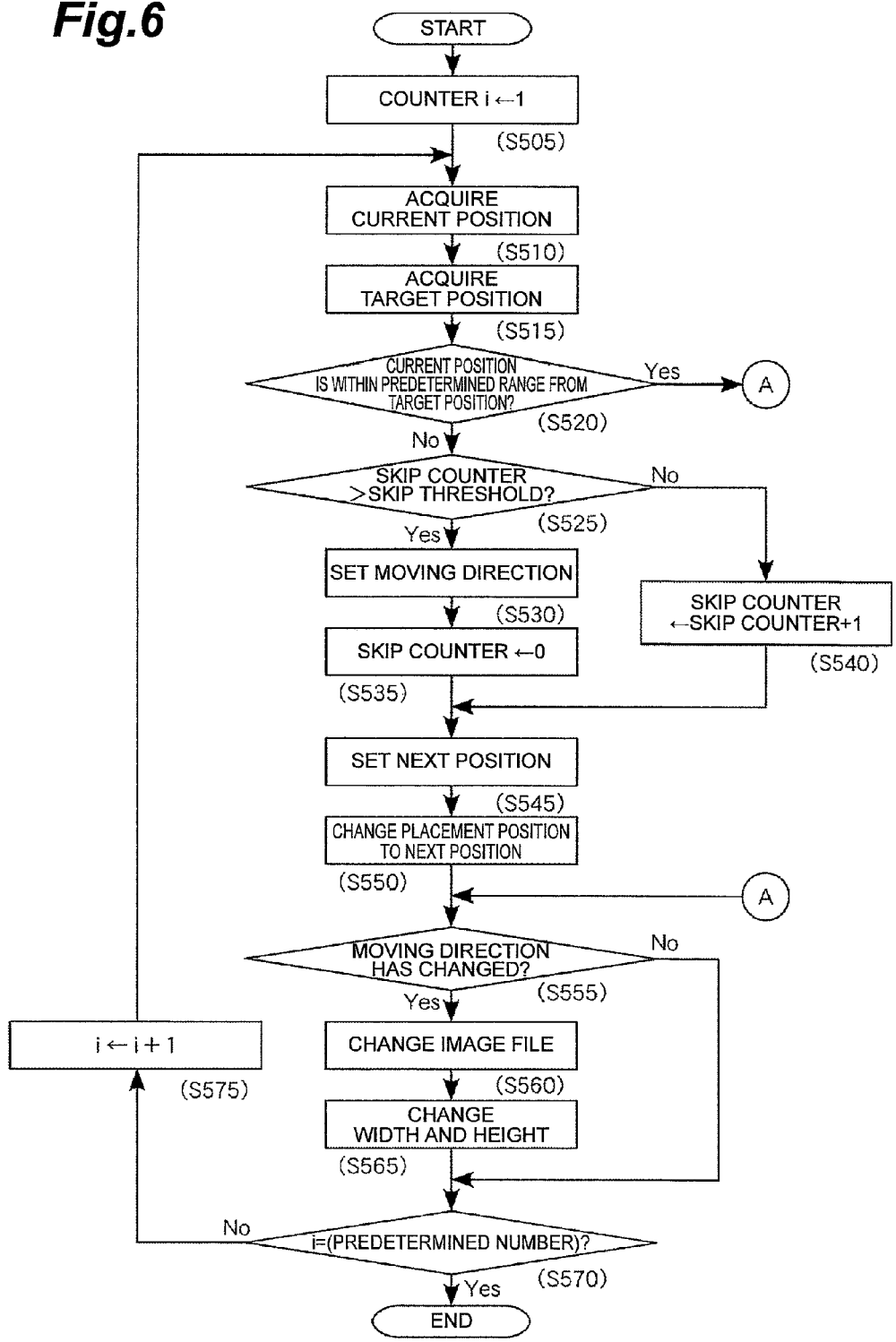
FIG. 6 is a flowchart showing a procedure of a display switching process (embodiment).
Figure 7:
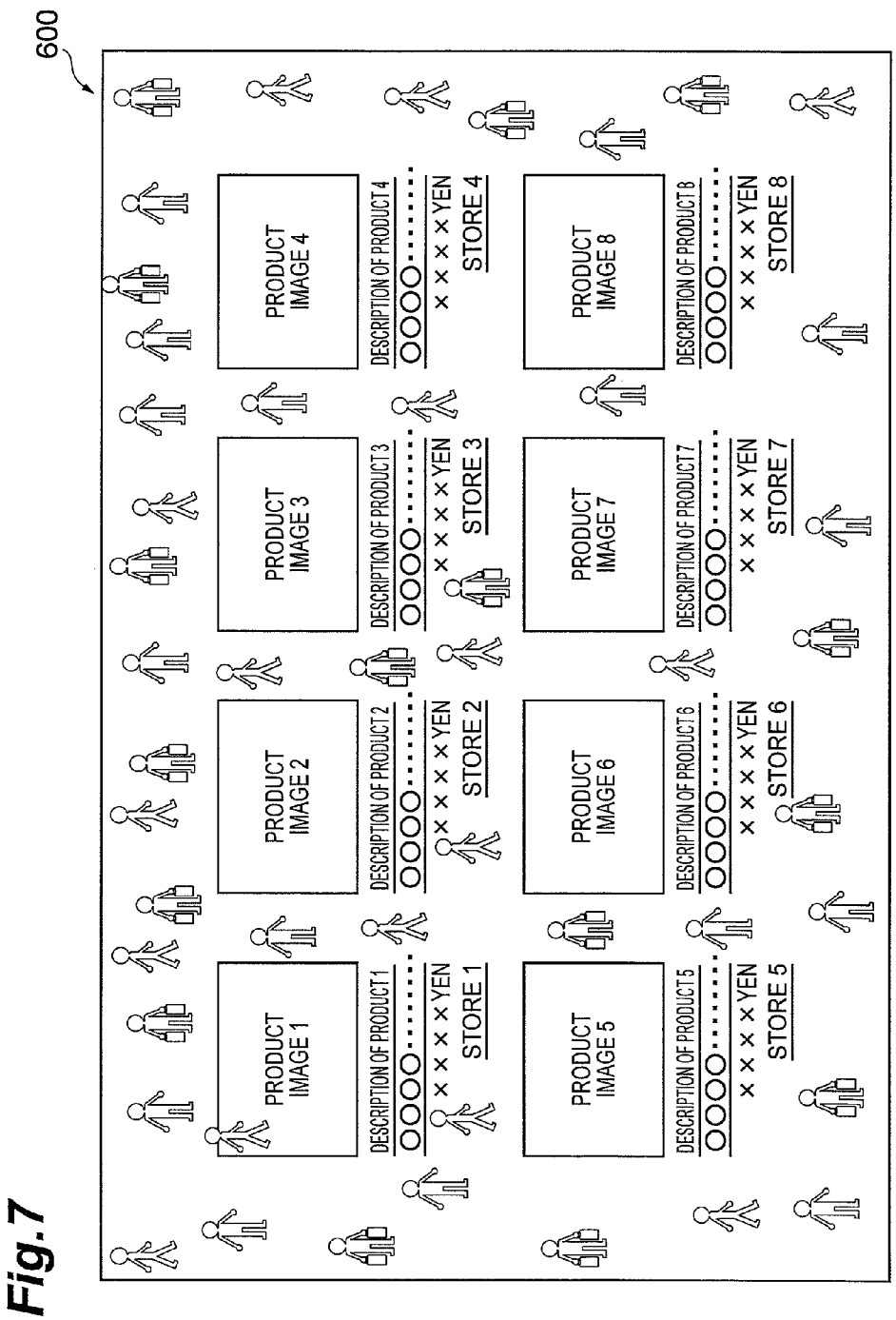
FIG. 7 is a display example of a Web page (just after start) (embodiment).
Figure 8:
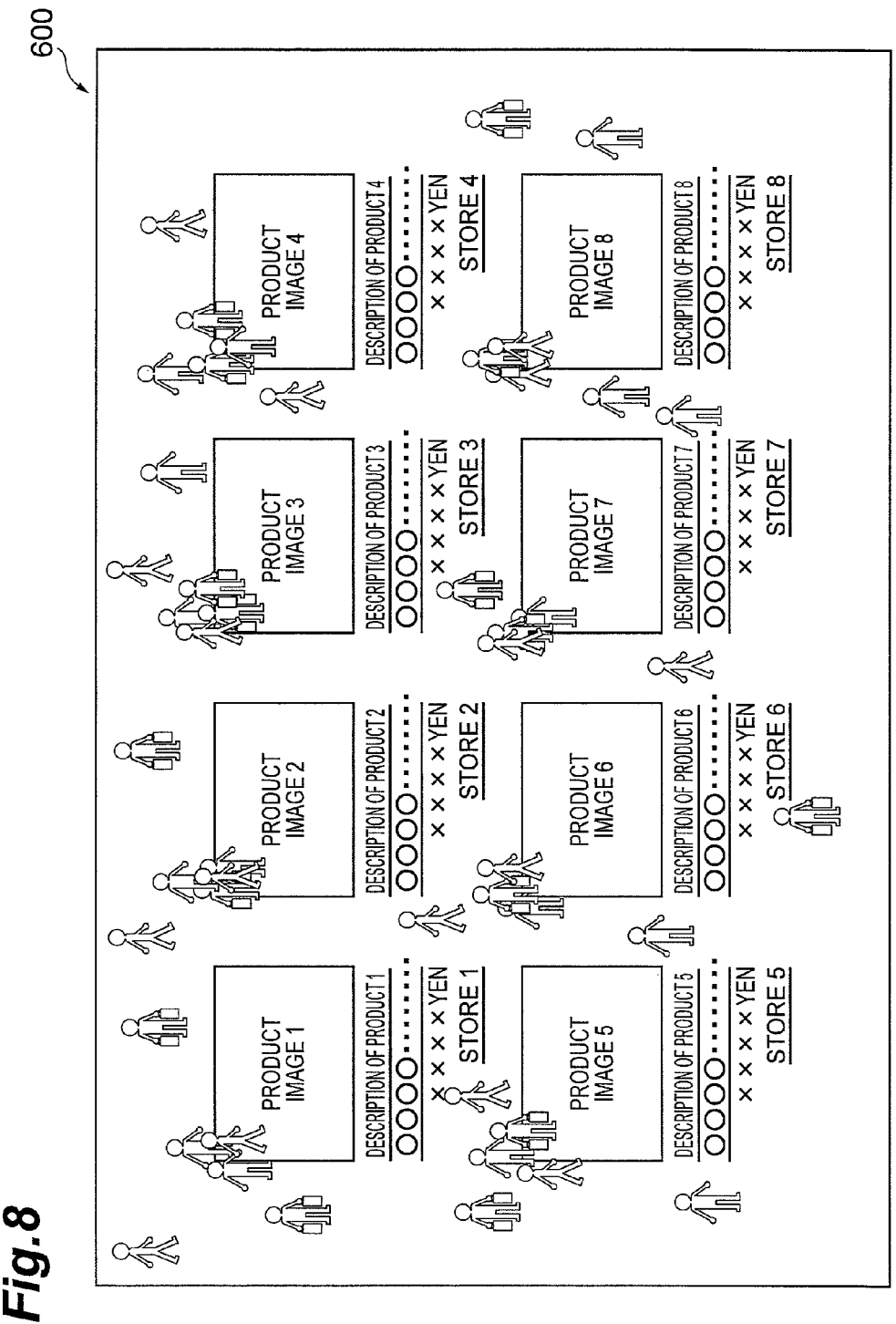
FIG. 8 is a display example of a Web page (during process) (embodiment).
Figure 9:
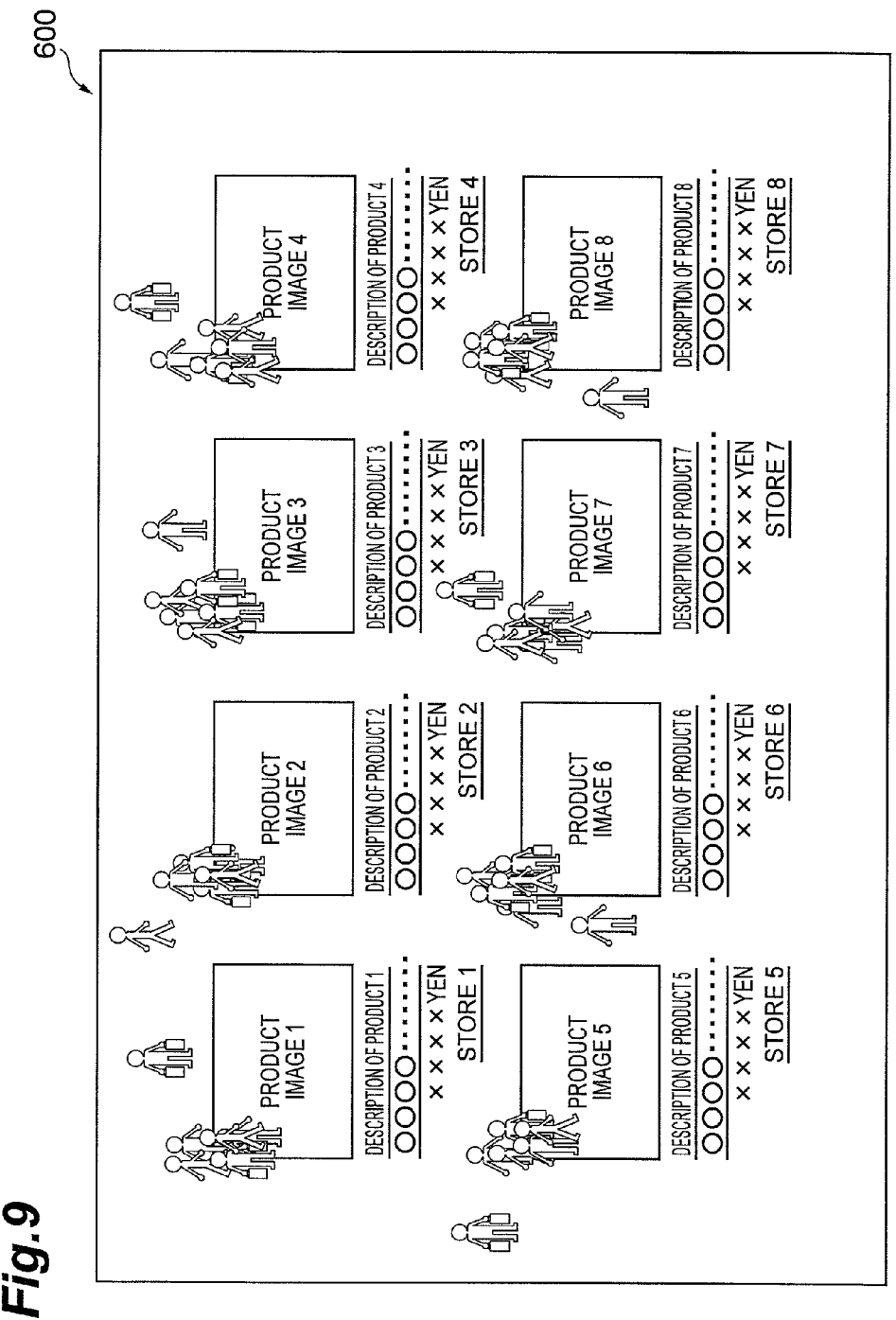
FIG. 9 is a display example of a Web page (during process) (embodiment).
Figure 10:
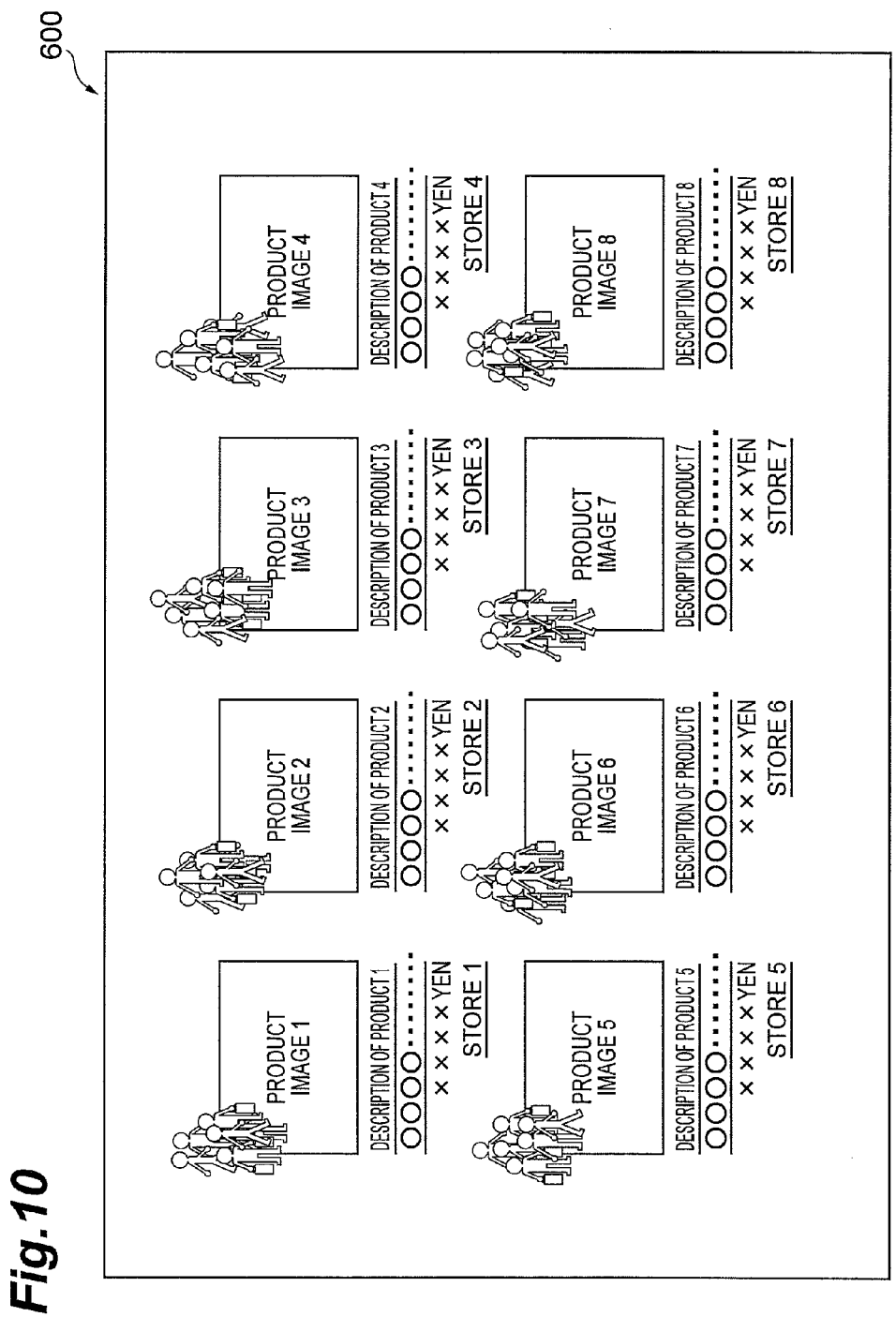
FIG. 10 is a display example of a Web page (after completion) (embodiment).

In this embodiment, whether a change has occurred in the moving direction of the icon[i] is determined by comparing the "moving direction" and the "previous moving direction" (S555 in FIG. 6).

[(d-5) Moving Direction Indicating Data Array]

In FIG. 5, the "moving direction indicating data array" is an array to store numerical values indicating the moving direction. For example, total nine elements (numerical values) are stored, and the former five elements (0, 1, 2, 3, 4 in sequence) are invariant values and the latter four values are variable values.

In this embodiment, a certain weight is assigned to each moving direction by changing numerical values to be set as the invariant values as appropriate in order for the icon[i] to easily move to the direction of the target position (S530 in FIG. 6).

For example, the current access data or its differentiated value, or the current server load or its differentiated value by time is acquired, and, in the case where access stays steady or where it tends to be less crowded, the speed of displacing the icons is increased because the user does not feel stressed and it does not cause load on the server even when access to the Web page is made from each of the elements.

[(e) Setting of Image File]

In the above step <23>, the user terminal 20 sets an image file to the icon[i] (S325).

Specifically, an image file corresponding to the icon number (FIG. 3) is set. Each image may be a still image or an animation image (for example, animation GIF format).

Note that the image is preferably an image that allows intuitive recognition of attributes (for example, gender and the like) of users who constitute a population of statistical data used for proportional distribution of icons. Further, text (numeric) may be contained in a part of each icon for easier recognition of attributes (for example, age group and the like) of users.

4. Display Switching Process

[(a) Procedure of Display Switching Process]

FIG. 6 shows a procedure of a display switching process.

As shown in FIG. 6, the user terminal 20 executes the display switching process by the following steps <31> to <36>. As described earlier, the display switching process is configured to be executed repeatedly every given time period (for example, 100 milliseconds) (cf. S255a in FIG. 2).

Note that the icon [i] still indicates the i-th icon (icon to which identification information containing i is attached).

<31> Substitute an initial value 1 into a counter i indicating the icon number (S505).

<32> Acquire the current position (the current placement position) and the target position of the icon[i] (S510, S515) and determine whether the current position is within a predetermined range from the target position (S520). When the current position is within the predetermined range from the target position (Yes in S520), change the numerical value indicating the moving direction to 0 (stop) and proceed to the following <35>. On the other hand, when the current position is not within the predetermined range from the target position (No in S520), proceed to the following <33>.

<33> Determine whether the determination expression "skip counter> skip threshold" is true or false (S525). When the determination expression is true (Yes in S525), set the moving direction of the icon[i] (S530), substitute 0 into the skip counter (S535), and proceed to the following <34>. On the other hand, when the determination expression is false (No in S525), add 1 to the skip counter (S540), and proceed to the following <34>.

<34> Set the next position (the position to be displayed next) of the icon[i] (S545) and change the placement position of the icon[i] to the next position (S550).

<35> Determine whether the moving direction of the icon [i] has changed or not (S555). When the moving direction of the icon[i] has changed (Yes in S555), change the image file according to the moving direction (S560), change the size (width and height) of the icon[i] in the Web page according to the image file after change (S565), and proceed to the following <36>. On the other hand, when the moving direction of the icon[i] has not changed (No in S555), proceed to the following <36>.

<36> Determine whether the counter i is equal to a predetermined number (the number of icons to be displaced in the Web page; 100 in this embodiment) (S570). When the counter i is equal to the predetermined number (Yes in S570), the display switching process ends. On the other hand, when the counter i is not equal to the predetermined number (No in S570), add 1 to the counter i (S575) and return to the above <32>.

[(b) Convergence of Icons]

In the above step <32>, the user terminal 20 determines whether the current position is within a predetermined range from the target position (S520). When the current position is within the predetermined range from the target position (Yes in S520), not displace the icon[i].

The displacement of the icon[i] thereby ends at the timing when the icon[i] reaches the vicinity of the target position, and the icon[i] stops in the vicinity of the target position.

[(c) Maintenance of Moving Direction]

In the above step <33>, the user terminal 20 determines whether the determination expression "skip counter> skip threshold" is true or false (S525). When the determination expression is false (No in S525), add 1 to the skip counter (S540) and proceed to the following <34>

This process prevents the moving direction from being changed frequently. Further, if the skip threshold is a random value, the moving direction can be changed at random timing for each of the icons.

[(d) Setting of Moving Direction]

In the above step <33>, the user terminal 20 sets the moving direction of the icon[i] (S530).

For example, it is preferred to set the next direction as follows, taking the positional relationship between the current position and the target position of the icon[i] into consideration. This increases the probability that the icon[i] is displaced in the direction of the target position.

<41> Obtain differences between the respective components of the current position (X1, Y1) and the target position (X2, Y2) and substitute predetermined values into variables for weighting w1 and w2.

Horizontal variable for weighting w1←2(right) when (X1−X2) is negative, 4(left) when it is positive
  Vertical variable for weighting w2←3(down) when (Y1−Y2) is negative, 1(up) when it is positive <42> Set the values of the variables w1 and w2 to the variable values of "moving direction indicating data array" (cf. FIG. 5). For example, two each of the values of the variables w1 and w2 are set to the four variable values.

<43> Randomly select any of the weighted elements of "moving direction indicating data array" (in this example, total nine elements of invariant values and variable values) and set the selected one as the next direction.

[(e) Setting of Next Position]

In the above step <34>, the user terminal 20 sets the next position (the position to be displayed next) of the icon[i] (S545)

Specifically, a position that is separated by the one-step displacement distance from the current position in the next direction is set as the next position. When the numerical value indicating the moving direction is 0(stop), the current position is set as the placement position as it is (the placement position is not changed).

[(f) Change of Image File]

In the above step <35>, the user terminal 20 determines whether the moving direction of the icon[i] has changed or not (S555). When the moving direction has changed (Yes in S555), change the image file according to the moving direction (S560).

Specifically, whether the moving direction has changed or not is determined by comparing the "moving direction" and the "previous moving direction". When the moving direction has changed, it is preferred to change the image file into an image corresponding to the moving direction after change (for example, an image facing the moving direction). After changing the image file, substitute the numerical value indicating the "moving direction" into the "previous moving direction".

[(g) Display Example]

FIGS. 7 to 10 show display examples of a Web page.

FIGS. 7 to 10 are display examples in which character images (images having a certain region; a part other than the part corresponding to the body of the character is transparent) are used as icons and which show the way the icons are randomly displaced and converge on the vicinity of the elements within the page.

(FIG. 7) In a Web page (600), each of the icons is placed at the initial positions respectively set at random positions outside the display area within the browser display space. The number of initial positions is set according to the number of the Web page views of each element during the past certain period, the click-through rate of each element during the past certain period, or the order quantity of a product sold or a service provided through the Web page of each element during the past certain period by reference to the use history DB 13. Further, the current access data or its differentiated value, or the current server load or its differentiated value by time may be acquired, and, in the case where access concentration to the Web page is occurring or access concentration to the Web page is likely to occur, the number of initial positions may be adjusted to be smaller.

Further, the differentiated value of the current access data or the current server load by time may be acquired, and in the case where the access count exceeds a certain threshold or where the differentiated value of the access count exceeds a certain threshold by reference to the server load on the Web server 10, the number of initial positions may be adjusted to be smaller for access control.

(FIG. 8) The icons are repeatedly displaced in random directions independently of one another outside the display area. The icons being displaced are changed into images facing their moving directions. Some icons are stopping in the vicinity of their target positions which are set at the top left corner of the target elements.

Like the case of setting the initial position, by obtaining the current access data or its differentiated value, or the current server load or its differentiated value by time and decreasing the speed of displacing the icons when access concentration to the Web page is occurring or when access concentration to the Web page is likely to occur, it is possible to guide a user to a page that causes no stress and equalize the server load.

For the distribution ratio of the target positions as well, by obtaining the current access data or its differentiated value for the Web page of each of the elements and decreasing the speed of displacing the icons when access concentration to a specific Web page is occurring or when access concentration to a specific Web page is likely to occur, it is possible to guide a user to a page that causes no stress and equalize the server load.

On the contrary, when access stays steady or when it tends to be less crowded, it is preferred to increase the speed of displacing the icons because the user does not feel stressed and it does not cause load on the server even when access to the Web page is made from each of the elements.

(FIG. 9) Most of the icons are stopping at a partial region of the target position. Although they are stopping at a partial region in this embodiment, they may be stopping in the vicinity of the display area without overlapping with the display area.

(FIG. 10) All of the icons have converged on the vicinity of their target positions.

As is obvious from the above display examples, in the system according to the embodiment, a plurality of icons are respectively displaced and converge on each element or its vicinity in the page without overlapping with the display area, thereby visually representing the degree of gathering of people to a product or the degree of crowdedness of a shop on the Web page.

As a result, users who visit the Web page can intuitively recognize the degree of popularity of each content.

5. Alternative Example

Alternative Example 1

Move Icons by User Operation

All or some of the icons placed in the Web page may be moved by user operation (for example, drag and drop).

For example, it is preferred to change the placement position of the dragged icon to the dropped position. In this case, the initial position of the moved icon may be set as the dropped position, so that displacement by the display switching process (S255 in FIG. 2) is performed thereon.

Alternative Example 2

Another Embodiment that Displaces Icon Not To Overlap with Specific Element

The icons may be displaced in the Web page so as not to overlap with a specific element placed in the page.

For example, the content region of an element (for example, an element to which a specific name is added, an element of a specific tag name or the like) placed in the Web page is set as a do-not-enter space, and its top left corner and bottom right corner are specified. Then, when the icon overlaps with the do-not-enter space by the relationship with the top left corner and the bottom right corner of the icon, the moving direction is preferably changed into 0(stop). It is thereby possible to temporarily stop the displacement of the icon that is likely to enter the do-not-enter space.

Note that the above process is executed between the next position setting step (S545 in FIG. 6) and the placement position changing step (S550 in FIG. 6).

Alternative Example 3

It may be configured so that the icons converge on the vicinity of an arbitrary selected element, not on the basis of statistical data. It is thereby possible to intentionally create a populated atmosphere for the specific element.

In this case, it is preferred to specify candidates for the target element as follows and set the target position within or in the vicinity of the content region of an element that is randomly selected from the candidates for each icon.

Set elements of specific tag names (for example, <img> tag, <a> tag and the like) as candidates for the target element.

Add specified names to specific elements (for example, specific link images, specific link text or other specific link elements) in the Web page, and set the elements with those names as candidates for the target element.

Alternative Example 4

An element to change the interval (frame rate) of the display switching process (S255a in FIG. 2, FIG. 6) may be placed in the Web page. For example, it is preferred to allow selection of a predetermined numerical value by a radio button or a pull down menu or input of an arbitrary numerical value into an input field.

An animation stop button may be placed in the Web page. When the button is clicked, repetition of the display switching process (S255a in FIG. 2, FIG. 6) stops.

A reset button may be placed in the Web page. When the button is clicked, all icons are reset to their initial positions, and the repetitive processing of the display switching process (S255a in FIG. 2, FIG. 6) is executed again.

REFERENCE SIGNS LIST

10 . . . Web server, 11 . . . Web DB, 12 . . . User DB, 13 . . . Use history DB, 20 . . . User terminal, 30 . . . Internet, 600 . . . Web page

The invention claimed is:

1. A Web server, including at least one processor, for a Web page containing a plurality of elements to displace icons, comprising:
    a first unit, within said processor, for enabling recognition of a display area of the elements in the Web page;
    a target element setting unit, within said processor, for enabling setting of any element among the plurality of elements as a target element of the icons;
    a second unit, within said processor, for enabling decision of the number of initial positions of the icons to be displaced toward the target element, based on access data pertaining to the target elements, after setting the target element;
    an initial position setting unit, within said processor, for enabling setting of the initial positions of at least some of the icons to be displaced toward the target element in the Web page to positions distanced from the target element, after setting the target element;

a target position setting unit, within said processor, for enabling setting of a target position within or in a vicinity of the recognized display area of the set target element for each of the icons; and an object displacement unit, within said processor, for enabling displacement of each of the icons by designating a path starting at the initial position and lying outside the recognized display area of the elements in the Web page and displacing each of the icons to the target position or its vicinity.

2. The Web server according to claim 1, wherein the initial position setting unit enables setting of the initial positions of the icons outside the display area of the elements in the Web page.

3. The Web server according to claim 1, further comprising:

an access data extraction unit, within said processor, for enabling extraction of one data from access data including at least one of the number of page views of a Web page linked from each of the elements during a past certain time period, a click-through rate of a link corresponding to each of the elements during a past certain time period, and an order quantity of a product sold or a service provided through a Web page linked from each of the elements during a past certain time period, wherein the target element setting unit enables setting of the target element among the plurality of elements based on the extracted access data.

4. The Web server according to claim 1, further comprising:

an access load detection unit, within said processor, for enabling detection of a current server load of a Web server that provides a Web page linked from each of the elements, wherein the target element setting unit enables setting of the target element among elements for which the server load is less than a certain threshold.

5. The Web server according to claim 1, further comprising:

an access data extraction unit, within said processor, for enabling extraction of one data during a certain time period being a certain period ago among access data including at least one of the number of page views of a Web page linked from each of the elements during a past certain time period, a click-through rate of a link corresponding to each of the elements during a past certain time period, and an order quantity of a product sold or a service provided through a Web page linked from each of the elements during a past certain time period, wherein the initial position setting unit enables decision of the number of initial positions based on the extracted data by reference to extraction by the access data extraction unit, and setting of the plurality of initial positions at positions outside the display area of the elements in the Web page.

6. The Web server according to claim 5, wherein the period is a period of any one of one day, one week, one month and one year, the certain time period is a certain length of time, and the initial position setting unit enables decision of the number of initial positions based on any data of the number of page views, a click-through rate and an order quantity during the length of time.

7. The Web server according to claim 1, further comprising:

an access data extraction unit, within said processor, for enabling extraction of one data from access data including at least one of the number of page views of a Web page linked from each of the elements during a past certain time period, a click-through rate of a link corresponding to each of the elements during a past certain time period, and an order quantity of a product sold or a service provided through a Web page linked from each of the elements during a past certain time period, wherein the target position setting unit enables setting of the target element for each of the plurality of icons based on the extracted access data.

8. The Web server according to claim 1, further comprising:

an access load detection unit, within said processor, for enabling detection of a current server load of a Web server that provides a Web page linked from each of the target element, wherein the target position setting unit enables setting of an element including the target position from each of the target element based on the server load.

9. The Web server according to claim 1, wherein the object displacement unit comprises:

a next position candidate setting unit for enabling setting of a plurality of next position candidates being candidates for a position at which the object is to be displayed next;

a next position setting unit for enabling selection of any one position from the set next position candidates and setting the selected position as a next display position; and an object next position displacement unit for enabling displacement of the object from a current display position to the set next display position.

10. The Web server according to claim 9, wherein the next position candidate setting unit enables setting of a plurality of next direction candidates being candidates for a direction in which the object is to be displaced next, unevenly distributed toward the target position, in accordance with a positional relationship between a current display position of the object and the set target position, and the next position setting unit enables setting of the next position in each of directions of the set next direction candidates.

11. The Web server according to claim 10, wherein the next position unit enables execution of displacement by the object next position displacement unit when the set next position is outside the display area of the elements, and inhibition of execution of displacement by the object next position displacement unit when the set next position is not outside the display area of the elements.

12. The Web server according to claim 1, wherein the object displacement unit enables stopping of each of the icons temporarily at a certain probability or at random during displacement of the icon for each of the icons.

13. The Web server according to claim 1, further comprising:

an access data extraction unit, within said processor, for enabling extraction of one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period, wherein the object displacement unit enables stopping of each of the icons temporarily during displacement of the icon for each of the icons when the extracted access data is more than a certain threshold.

14. The Web server according to claim 1, further comprising:
- an access data extraction unit, within said processor, for enabling extraction of one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period,
- wherein the object displacement unit enables delay of convergence of each of the icons on the target position or its vicinity for each of the icons when the extracted access data is more than a certain threshold.

15. The Web server according to claim 1, further comprising:
- an access data extraction unit, within said processor, for enabling extraction of one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period,
- wherein the object displacement unit enables promotion of convergence of each of the icons on the target position or its vicinity for each of the icons when a differentiated value of the extracted access data is less than a certain threshold.

16. The Web server according to claim 1, further comprising:
- an access data extraction unit, within said processor, for enabling extraction of one data from access data including at least one of the number of page views of a Web page linked from each of the elements during a current certain time period, a click-through rate of a link corresponding to each of the elements during a current certain time period, and an order quantity of a product sold or a service provided through a Web page linked from each of the elements during a current certain time period,
- wherein the object displacement unit enables delay of convergence of each of the icons on the target position or its vicinity for each of the icons when a differentiated value of the extracted access data is more than a certain threshold.

17. The Web server according to claim 1, further comprising:
- an access load detection unit, within said processor, for enabling detection of a server load of a Web server that provides a Web page linked from each of the target element during a current certain time period,
- wherein the object displacement unit enables promotion of convergence of each of the icons on the target position or its vicinity for each of the icons when a differentiated value of the server load is less than a certain threshold.

18. The Web server according to claim 1, further comprising:
- an access load detection unit, within said processor, for enabling detection of a server load of a Web server that provides a Web page linked from each of the target element during a current certain time period,
- wherein the object displacement unit enables delay of convergence of each of the icons on the target position or its vicinity for each of the icons when a differentiated value of the server load is more than a certain threshold.

19. An object displacement method for a Web page containing a plurality of elements to displace icons, comprising:
- a step of recognizing a display area of the elements in the Web page;
- a target element setting step of setting any element among the plurality of elements as a target element of the icons;
- a step of deciding the number of initial positions of the icons to be displaced toward the target element, based on access data pertaining to the target elements, after setting the target element;
- an initial position setting step of setting the initial positions of at least some of the icons to be displaced toward the target element in the Web page to positions distanced from the target element, after setting the target element;
- a target position setting step of setting a target position within or in a vicinity of the recognized display area of the set target element for each of the icons; and
- an object displacement step of displacing each of the icons by designating a path starting at the initial position and lying outside the recognized display area of the elements in the Web page and displacing each of the icons to the target position or its vicinity.

20. A Web server, including at least one processor, connectable with a user terminal, comprising:
- a Web data storage for storing Web data at least including data of a Web page containing a plurality of elements and an object displacement program embedded in the Web page; and
- a Web data transmitting unit, within said processor, for transmitting the Web data to the user terminal in response to a request from the user terminal,
- wherein the object displacement program is an object displacement program for a Web page containing a plurality of elements to displace one or a plurality of icons toward each of the elements, the program causing a user terminal displaying the Web page containing the plurality of elements using a Web browser to execute:
- a step of recognizing a display area of the elements in the Web page;
- a target element setting step of setting any element among the plurality of elements as a target element of the icons;
- a step of deciding the number of initial positions of the icons to be displaced toward the target element, based on access data pertaining to the target elements, after setting the get element;
- an initial position setting step of setting the initial positions of at least some of the icons to be displaced toward the target element outside the display area of the elements in the Web page, by reference to the step of recognizing a display area, to positions distanced from the target element, after setting the target element;
- a target position setting step of setting a target position within or in a vicinity of a content region of the set target element for each of the icons; and
- an object displacement step of displacing each of the icons by designating a path starting at the initial position and lying outside the recognized display area of the elements in the Web page and making each of the icons converge on the target position or its vicinity by reference to the step of recognizing a display area.

21. A Web server, including at least one processor, connectable with a user terminal, comprising:
- a Web data storage for storing Web data at least including data of a Web page containing a plurality of elements and an object displacement program embedded in the Web page; and a Web data transmitting unit, within said processor, for transmitting the Web data to the user terminal in response to a request from the user terminal, wherein the object displacement program is an object displacement program for a Web page containing a plurality of elements to displace icons, the program causing a user terminal displaying the Web page containing the plurality of elements using a Web browser to execute:

a step of recognizing a display area of the elements in the Web Page;

a target element setting step of setting any element among the plurality of elements as a target element of the icons;

a step of deciding the number of initial positions of the icons to be displaced toward the target element, based on access data pertaining to the target elements, after setting the target element;

an initial position setting step of setting the initial positions of the icons to be displaced toward the tar et element in the Web page, to positions distanced from the target element, after setting the target element;

a target position setting step of setting a target position within or in a vicinity of the recognized display area of the set target element for each of the icons; and an object displacement step of displacing each of the icons by designating a path starting at the initial position and lying outside the recognized display area of the elements in the Web page and displacing each of the icons to the target position or its vicinity.

22. The Web server according to claim 1, wherein the object displacement unit enables displacement of each of the icons, without intruding into a display area, by designating a path starting at the initial position and lying outside the recognized display area of the elements in the Web page, based on the recognized display area, even if the elements were between the initial positions and the target element, and displacing each of the icons to the target position or its vicinity.

* * * * *